United States Patent Office 2,816,149
Patented Dec. 10, 1957

2,816,149

SYNTHESIS OF AN OCTATRIYNE

John Happel, Yonkers, and Charles J. Marsel, New York, N. Y., and Daniel Ressler, Clifton, N. J., and Gerald Mechanic, New York, N. Y., assignors, by mesne assignments, to the United States of America as represented by the Secretary of the Navy No Drawing. Application August 18, 1953, Serial No. 375,067

6 Claims. (Cl. 260—678)

This invention is concerned with the synthesis of certain organic compounds containing triple bonds, and more specifically, a practical and convenient process for preparing symmetrical acetylenic compounds having at least three triple bonds.

In general, it is well known that it is quite difficult to produce organic compounds having more than one triple bond. Compounds having a multiplicity of triple bonds are even more difficult to prepare. One such compound is octatriyne, which is a solid hydrocarbon having a melting point of 261° F. The properties of this compound make it a unique one, since it is a hydrocarbon having an unusually high melting point as well as three very reactive triple bonds. Although these compounds are not, in themselves, novel compositions, they have been up to the time of the present process, very difficult to prepare and were available only in very small quantities by means of quite laborious and complicated syntheses. For instance, the production of 2,4,6-octatriyne has been described in literature references by a series of involved and impractical steps. (J. B. Armitage et al., J. Chem. Soc., p. 2010, vol. 1952.) Such operations would definitely not be useful on a commercial scale.

It has been reported in the literature (Schlubach et al., Ann. 568, 141 (1950)) that the condensation of propargyl bromide and sodium acetylide gives as the only organic product, 1,3-pentadiyne. There is no indication in the literature that compounds having three triple bonds can be obtained by such condensations. Quite surprisingly, the condensation reaction of propargyl chloride with sodium acetylide gives a very good yield of the unexpected product, 2,4,6-octatriyne. The method is generally applicable to other organic chlorides having one triple bond in the molecule such as butynyl chloride, pentynylchloride, and the like. Although it is not intended to limit the reaction in any way to a theory or mechanism, it is believed from a study of the experimental data available that the reagents react and that at least one molecular rearrangement takes place to give the resulting, totally unexpected product.

The second reagent is a metallic acetylide, prepared by the well-known reaction between acetylene and an active metal selected from the classes of alkali metals and alkaline earth metals. In actual practice it is best to carry out the condensation by preparing the acetylide in situ by direct contact of acetylene with the appropriate metal. This is best done by preparing the acetylide in liquid ammonia.

An excess of acetylene is employed. The acetylenic chloride is then added to the mixture containing the acetylide in slurry or solution. This technique is believed to be the safest and most efficient for using the acetylide and this method helps to avoid the explosive hazards associated with the acetylide compounds during isolation storage, and handling.

The active metals which can be used include any of the alkali metals and the alkaline earth metals. Examples are sodium, potassium, lithium, rubidium, cesium, calcium, strontium, barium, and magnesium. Of these, sodium, potassium, lithium and calcium are the most practical.

The condensation should be carried out at relatively low temperatures in the range of −33° C. Liquid ammonia is ideally suited as the solvent and reaction diluent although other solvents may also be employed with lesser success.

The reactants should be allowed to remain in contact for a sufficient period of time such that a substantially complete reaction is reached. The product is quite surprisingly free of impurities and undesirable contaminants. The symmetrical acetylenic compounds having three triple bonds are generally solid materials at room temperature and can be readily recovered from the reaction mixture by well known and simple techniques. In the case of 2,4,6-octatriyne the product is isolated by evaporation of the ammonia, followed by extraction of the remaining solid with an organic solvent such as ether. The product is recovered directly from the ether solution.

The reaction can be carried out either as a batch operation or it can be done in a continuous manner. Batch reactions can be controlled somewhat more closely.

The novel reaction will be illustrated more in detail by the following examples although it is not intended to limit the invention in any way thereto.

*Example 1*

Into a large, insulated reactor equipped with suitable inlet and outlet lines, there was placed a large excess of liquid ammonia. The reactor was also equipped with a suitable device for adequate agitation of the reaction mixture. The liquid ammonia was then saturated with acetylene and about 1 molecular proportion of metallic calcium was added to the reactor. Acetylene was continuously introduced into the reactor during this time. This provided that the acetylide was satisfactorily prepared. A temperature of about −33° C. was maintained throughout the reaction period. About 2 molecular proportions of propargyl chloride was added immediately, in small portions, to the mixture in the reactor. From 2 to 4 hours was allowed for completion of the reaction. Then the ammonia was permitted to evaporate. An excess of ether was then added to the residue remaining. An excess of water, preferably ice, was added to the ether solution in order to complete the hydrolysis of the product mixture. Following evaporation or distillation of the ether solvent, a solid crystalline product of 2,4,6-octatriyne was obtained in a yield of over 50%. After recrystallization and vacuum sublimation, this product was identified as 2,4,6-octatriyne having a melting point of 261° F.

*Example 2*

The above reaction was also carried out under substantially the same conditions using acetylene and propargyl chloride but using metallic sodium instead of metallic calcium. The same good results with the same good yield of product, 2,4,6-octatriyne, was obtained.

From the above shown experiments, it is obvious that a novel, unexpected, and highly useful method has been invented for making the symmetrical acetylenic compounds having three triple bonds. The chlorides, acetylene and sodium or the other active metals giving the reaction, are all readily available and relatively cheap raw materials.

The products obtained by this process may be used for experimental testing for important chemical intermediates for other products, and for purposes where a highly reactive high energy organic compound or fuel is desired.

What is claimed is:

1. A process for the preparation of 2,4,6-octatriyne which comprises reacting an active metal with acetylene in a liquid ammonia medium, adding propargyl chloride to the resulting mixture, and isolating the product from the reaction residue.

2. A process according to that described in claim 1 in which the active metal is sodium.

3. A process according to that described in claim 1 in which the active metal is calcium.

4. A process for the preparation of 2,4,6-octatriyne which comprises saturating liquid ammonia with acetylene in an insulated reactor, adding an element of the class consisting of the alkali metals and the alkaline earth metals together with acetylene simultaneously and maintaining the temperature in the reactor at about −33° C., adding propargyl chloride to the mixture, evaporating the ammonia, adding an excess of ether to residue, adding an excess of water to the residue to complete hydrolysis, and evaporating the ether solvent.

5. A process for the preparation of 2,4,6-octatriyne which comprises saturating liquid ammonia with acetylene in an insulated reactor, adding metallic calcium and acetylene simultaneously and maintaining the temperature in the reactor at about −33° C., adding propargyl chloride to the mixture, evaporating the ammonia, adding an excess of ether to the residue, adding an excess of water to the residue to complete hydrolysis, and evaporating the ether solvent.

6. A process for the preparation of 2,4,6-octatriyne which comprises saturating liquid ammonia with acetylene in an insulated reactor, adding metallic sodium and acetylene simultaneously and maintaining the temperature in the reactor at about −33° C., adding propargyl chloride to the mixture, evaporating the ammonia, adding an excess of ether to the residue, adding an excess of water to the residue to complete hydrolysis, and evaporating the ether solvent.

References Cited in the file of this patent

UNITED STATES PATENTS

| 1,971,656 | Perkins et al. | Aug. 28, 1934 |
| 2,029,120 | Schilling et al. | Jan. 28, 1936 |
| 2,198,236 | Vaughn | Apr. 23, 1940 |

OTHER REFERENCES

Bergmann: "Acetylene Chemistry," page 33 (1948). Pub. by Interscience Publishers, Inc., New York, N. Y.

Schlubach et al.: Liebig's Annalen der Chemie, vol. 568, pages 141–159 (1950) (pages 154 and 158 only relied on). (Abstracted in Chem. Abstracts, vol. 44, page 8313f (1950).)

Jones et al.: Nature, vol. 168, pages 900–903 (1951). Abstracted in Chem. Abstracts, vol. 46 (1952), page 6077.